United States Patent
Chiba et al.

(10) Patent No.: US 9,674,480 B2
(45) Date of Patent: Jun. 6, 2017

(54) CAMERA LINK RECORDER

(71) Applicant: TEAC Corporation, Tokyo (JP)

(72) Inventors: Katsuhito Chiba, Saitama-ken (JP);
Ryotaro Hongo, Saitama-ken (JP);
Hirotoshi Shimada, Tokyo (JP)

(73) Assignee: TEAC Corporation, Tokyo (JP)

( * ) Notice: Subject to any disclaimer, the term of this patent is extended or adjusted under 35 U.S.C. 154(b) by 114 days.

(21) Appl. No.: 14/871,727

(22) Filed: Sep. 30, 2015

(65) Prior Publication Data

US 2016/0100125 A1    Apr. 7, 2016

(30) Foreign Application Priority Data

Oct. 1, 2014   (JP) ................... 2014-202900
Jul. 24, 2015  (JP) ................... 2015-146965
Sep. 25, 2015  (JP) ................... 2015-187989

(51) Int. Cl.
*H04N 5/89*    (2006.01)
*H04N 5/77*    (2006.01)
*H04N 9/82*    (2006.01)
*H04N 5/04*    (2006.01)

(52) U.S. Cl.
CPC ............. *H04N 5/77* (2013.01); *H04N 9/8211* (2013.01); *H04N 5/04* (2013.01)

(58) Field of Classification Search
CPC ........... H04N 5/04; H04N 5/77; H04N 9/8211
USPC ....................................... 386/335
See application file for complete search history.

(56) References Cited

U.S. PATENT DOCUMENTS

| | | | |
|---|---|---|---|
| 2009/0167366 A1* | 7/2009 | Wang | H04N 21/4302 327/105 |
| 2010/0179673 A1 | 7/2010 | Muroi | |
| 2011/0206355 A1* | 8/2011 | Toba | H04N 5/44 386/355 |
| 2012/0033129 A1* | 2/2012 | Miura | H04N 21/43635 348/441 |

FOREIGN PATENT DOCUMENTS

| | | |
|---|---|---|
| JP | 2001-351366 A | 12/2001 |
| JP | 2010-165403 A | 7/2010 |
| JP | 5359797 B2 | 12/2013 |

* cited by examiner

*Primary Examiner* — William Tran
(74) *Attorney, Agent, or Firm* — Seed Intellectual Property Law Group LLP (57) ABSTRACT

There is provided a camera link recorder capable of recording sounds by a clock signal synchronized with a clock signal of a camera.

A recorder is linked to a camera by means of an HDMI cable, and others. An HDMI receiver of the recorder reproduces an LRCK signal, which is an audio clock signal of a camera, from the HDMI signal, and outputs the LRCK signal. A CPU outputs a clock signal, which is generated from the LRCK signal when a frequency of the LRCK signal corresponds to a predetermined frequency of an audio CODEC, as a master clock signal to the audio CODEC. In other case, the clock signal generated from the internal clock signal CLK is output as a master clock signal to the audio CODEC.

7 Claims, 6 Drawing Sheets

FIG. 6

CAMERA LINK RECORDER

PRIORITY INFORMATION

This application claims priorities to Japanese Patent Application Nos. 2014-202900 filed on Oct. 1, 2014, 2015-146965 filed on Jul. 24, 2015, and 2015-187989 filed on Sep. 25, 2015 which are incorporated herein by reference in their entirety.

BACKGROUND OF THE INVENTION

Technical Field

The present invention relates to a camera link reorder and, more particularly, to control of a clock signal.

Related Art

It has become common for single-lens reflex cameras or mirrorless single-lens reflex cameras to be able to record motion pictures as well as still pictures. However, recording quality of sounds achieved during recording of motion pictures is not good enough.

Accordingly, some users of the digital SLR cameras or mirrorless SLR cameras record motion pictures records motion pictures with a camera and sounds by use of sound-specific recorders. Subsequently, the users mix the motion picture data and the audio data by use of a PC, and others, thereby creating motion pictures with high quality of motion pictures and sounds.

However, in this case, a clock error between the motion picture data and the audio data attributable to a difference in internal clocks of the respective devices. For instance, provided that the camera has a clock error of +20 ppm and that the recorder has a clock error of −20 ppm, when pictures and sounds are recorded for 24 hours by use of these devices, the camera actually records pictures for 23 hours, 59 minutes, and 58 seconds; and the recorder actually records sounds for 24 hours, 00 minute, and 02 seconds. Thus, the amount of discrepancy becomes greater as time elapses. Accordingly, the clock signals of the respective devices must be synchronized with each other.

JP 5359797 B describes a camera system in which an imaging element for outputting a video signal is integrated into an exchangeable lens unit. The description states that a main body unit to which the lens unit is to be linked is equipped with sound input means for acquiring audio data and sync signal input means for inputting a sync signal output from the lens unit. The description also mentions that, when motion pictures are recorded, audio data are recorded in synchronism with a sync signal output from the lens unit.

JP 2001-351366 A describes generating master clock for a slave device from word clock supplied from a master device; and performing adjustment so as to cause the master clock of the slave device to match with the word clock supplied from the master device, in accordance with a trigger signal supplied from the master device.

JP 2010-165403 A describes linking a master device with a slave device by a USB cable; generating, as operation clock, audio clock to be synchronized with a specific packet included at a predetermined cycle in transmission data or received data; and synchronizing the master device with the slave device during recording.

Incidentally, when motion pictures are recorded with a camera and when sounds are recorded with an audio-specific recorder, a conceivable way is to link the camera with the recorder by way of an HDMI (Registered Trademark). Since one cable enables transmission of videos, sounds, and control signals, wiring among devices can be simplified, the recorder can also be activated in synchronism with shutter operation of the camera.

When the camera and the recorder are linked by way of the HDMI, it will be convenient so long as the clock signal of the camera and the clock signal of the recorder can be synchronized to each other by use of the HDMI link. The related-art technique does not disclose synchronization of the clock signals by use of the HDMI signal on the premise that the camera and the recorder are linked to each other by way of the HDMI.

The HDMI includes a TMDS (Transition Minimized Differential Signaling) signal, and a clock signal can be generated from the TMDS signal. Hence, it is also conceivable to use the clock signal in both the camera and the recorder. However, a problem may occur in consistency with internal clock of the recorder and consistency with specifications of an HDMI receiver.

SUMMARY

The present invention provides a camera link recorder capable of recording sounds by means of a clock signal synchronized with a clock signal of a camera when linked with the camera by way of an HDMI (regardless of whether it is of a wired or wireless type).

A camera link recorder of the present invention includes an HDMI receiver for receiving an audio clock signal of a camera according to an HDMI signal transmitted from the HDMI-linked camera; a signal processing section for subjecting an input audio signal to digital conversion and encoding and storing the signal; and a control section for supplying the audio clock signal as a master clock signal of the signal processing section when the audio clock signal generated by the HDMI receiver is at a predetermined frequency corresponding to the signal processing section, and for supplying an internal clock signal as the master clock signal of the signal processing section when there is not the audio clock signal or when the audio clock signal is not at a predetermined frequency corresponding to the signal processing section.

In one embodiment of the present invention, the camera link recorder further has a phase-locked loop circuit for matching a phase of the audio clock signal to a phase of the internal clock signal.

In another embodiment of the present invention, the audio clock signal is a signal generated from an LRCK signal.

In still another embodiment of the present invention, the audio clock signal is an MCLK signal.

In yet another embodiment of the present invention, the camera link recorder further includes a setting section for setting whether or not to establish synchronization with the audio clock signal of the camera; wherein the control section supplies the audio clock signal as the master clock signal when the setting section has already set synchronization, and supplies the internal clock signal as the master clock signal when the setting section has not set synchronization, thereby controlling power of the HDMI receiver to OFF.

In still another embodiment of the present invention, the control section supplies the internal clock signal as the master clock signal when the HDMI cable is not linked, thereby controlling power of the HDMI receiver to an OFF position.

In yet another embodiment of the present invention, the control section selectively supplies either a signal generated from the LRCK signal or an MCLK signal as the master clock signal of the signal processing section by switching.

According to the present invention, when the recorder is linked to the camera via the HDMI, sounds can be recorded by a clock signal synchronized to a clock signal of the camera. A time lag between mot ion picture data and audio data due to a difference between an internal clock of the camera and an internal clock of the recorder.

The invention will be more clearly comprehended by reference to the embodiments provided below. However, the embodiments provided below are illustrative, and the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION

Embodiments of the present invention will be described hereunder by reference to the drawings. The following embodiments are illustrative, and the present invention is not limited to the following embodiments.

First Embodiment

Figure 1:
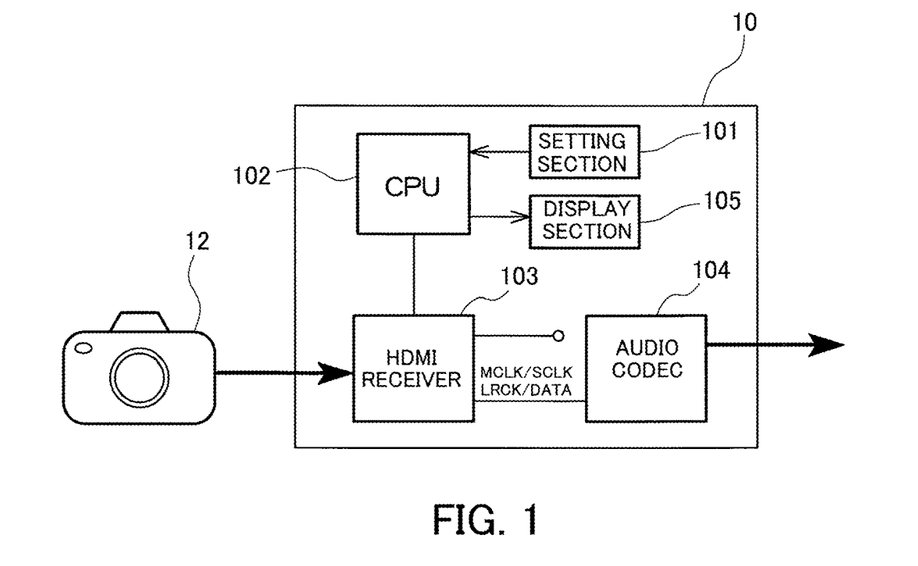
FIG. 1 is a block diagram of a configuration of a first embodiment.

FIG. 1 is a block diagram showing that a recorder 10 of a first embodiment is linked with a camera 12. The camera 12 is a digital single-lens reflex camera, a mirrorless single-lens reflex camera, and others. The camera 12 is linked with the recorder 10 by way of a wired or wireless HDMI. The embodiment shows a case where the recorder 10 and the camera 12 are linked to each other by way of an HDMI cable.

The recorder 10 is a PCM recorder and records a sound signal in a linear PCM:WAV format which does not irreversibly compress an audio signal. However, the recorder 10 can also be compatible with an irreversible compression format, such as MP3. The recorder 10 is equipped with, as configuration blocks, a setting section 101, a CPU 102, an HDMI receiver 103, an audio CODEC 104, and a display section 105.

A user of the camera 12 and the recorder 10 operates the setting section 101 in order to turn on and off power of the recorder 10 and input various settings. In the embodiment, the setting section 101 is operated particularly when a clock signal of the recorder 10 is synchronized with a clock signal of the camera 12. When synchronizing the clock signals, the user sets the setting section 101 to SYNC ON. In the meantime, when not synchronizing the clock signals, the user sets the setting section 101 to SYNC OFF.

The CPU 102 controls individual sections of the recorder 10. The CPU 102 is linked to the HDMI receiver 103, which will be described later, by means of an I2C bus, controlling HDMI information received by the HDMI receiver 103 and a CEC command (a command for controlling linked devices). In the present embodiment, the CPU 102 particularly determines whether or not to take the clock signal used for audio signal processing as an internal clock signal or an HDMI clock signal.

The HDMI receiver 103 outputs an LRCK signal, a BCLK (or an SCLK) signal, a data signal, and an MCLK signal from a TMDS CH-0 signal, a TMDS CH-1 signal, a TMDS CH-2 signal, and a TMDS clock (CLOCK) signal. The LRCK signal is a signal showing whether or not data achieved in the period represent a Left (CH-1) or a Right (CH-2). The LRCK signal shows that data in a period show Left at a low level and Right at a high level. The BCLK signal is a clock which serves as a standard for determining a level by sampling data and latches a signal level at a rising edge. The data signal is one generated by digitizing an analog audio signal. The MCLK signal is an audio clock signal of the camera 12; namely, a master clock signal. The HDMI receiver 103 supplies the signals to the audio CODEC 104 under the control of the CPU 102.

The audio CODEC 104 subjects the audio signal to various types of processing including AD conversion and encoding, storing and recording the thus-processed signal into semiconductor memory, and the like, by way of the CPU 102. Further, the audio data stored in the memory are read by way of the CPU 102 and subjected to decoding and DA conversion, and the converted signal is output as an analog audio signal.

The CPU 102 determines whether or not to use the internal clock signal or the HDMI clock signal as the master clock signal that is to be employed when the audio CODEC performs processing and supply a determination result to the audio CODEC 104. Namely, in a case where the user seeks synchronism with the camera 12 by operating the setting section 101, the HDMI clock signal is supplied to the audio CODEC 104 when predetermined conditions are met, thereby synchronizing the clock signal of the camera 12 with the clock signal of the audio CODEC 104. On the other hand, in a case where the user does not seek synchronism with the camera 12 by operating the setting section 101 or where the predetermined conditions are not met even when the user seeks synchronism, the internal clock signal is supplied to the audio CODEC 104.

By use of the HDMI clock signal, the display section 105 displays whether or not the recorder 10 is synchronized with the camera 12. Specifically, when the recorder 10 is synchronized with the camera 12, "HDMI LOCK" appears. When the recorder 10 is not synchronized, "HDMI UNLOCK" appears.

Figure 2:
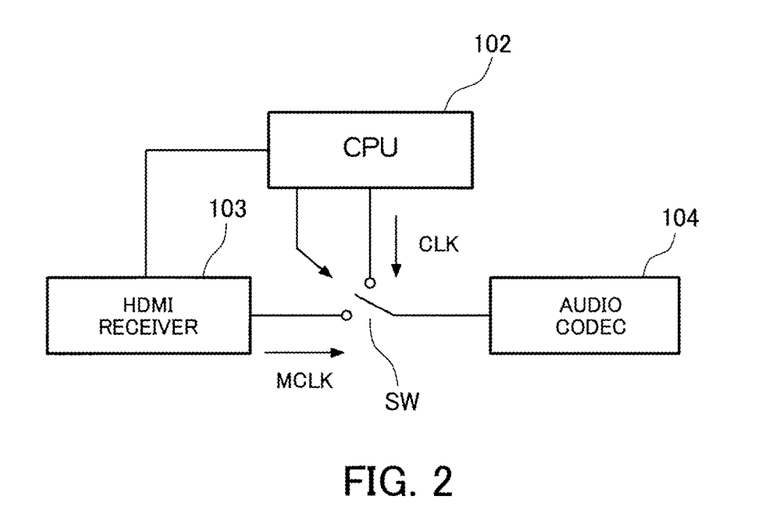
FIG. 2 is an explanatory view of switching of a master clock signal of the first embodiment.

FIG. 2 is an explanatory view diagrammatically illustrating switching of the master clock signal performed by the recorder 10.

The HDMI receiver 103 outputs the MCLK signal, which is the audio clock signal of the camera 12, to the switch SW. Further, the CPU 102 outputs an internal clock signal CLK to the switch SW. Receiving the HDMI information from the HDMI receiver 30, the CPU 102 determines whether or not the MCLK signal from the HDMI receiver 103 satisfies predetermined conditions. When the MCLK signal does not satisfy the predetermined conditions, the switch SW is switched to the CPU 102 to supply the internal clock signal from the CPU 102 as the master clock signal to the audio CODEC 104. Meanwhile, when the predetermined conditions are satisfied, the switch SW is switched to the HDMI receiver 103 to supply the MCLK signal from the HDMI receiver 103 as a master clock signal to the audio CODEC 104. The audio CODEC 104 records the input audio signal by subjecting the input audio signal to digital conversion and encoding by use of the supplied master clock signal and storing it into the memory. The predetermined conditions are that:

the user should set the HDMI SYNC ON by operating the setting section 101;
the MCLK signal from the HDMI receiver 103 should be LOCKed; and
a frequency of the MCLK signal should be a predetermined frequency.

The predetermined frequency of the master clock signal is one at which the audio CODEC 104 performs digital conversion and encoding. For instance, a sampling frequency of a CD system is 44.1 kHz, and a sampling frequency of a DVD system is 48 kHz. Alternatively, frequencies are obtained by multiplying the sampling frequencies of the systems by a constant (128 times, 256 times, 512 times, and others).

Figure 3:
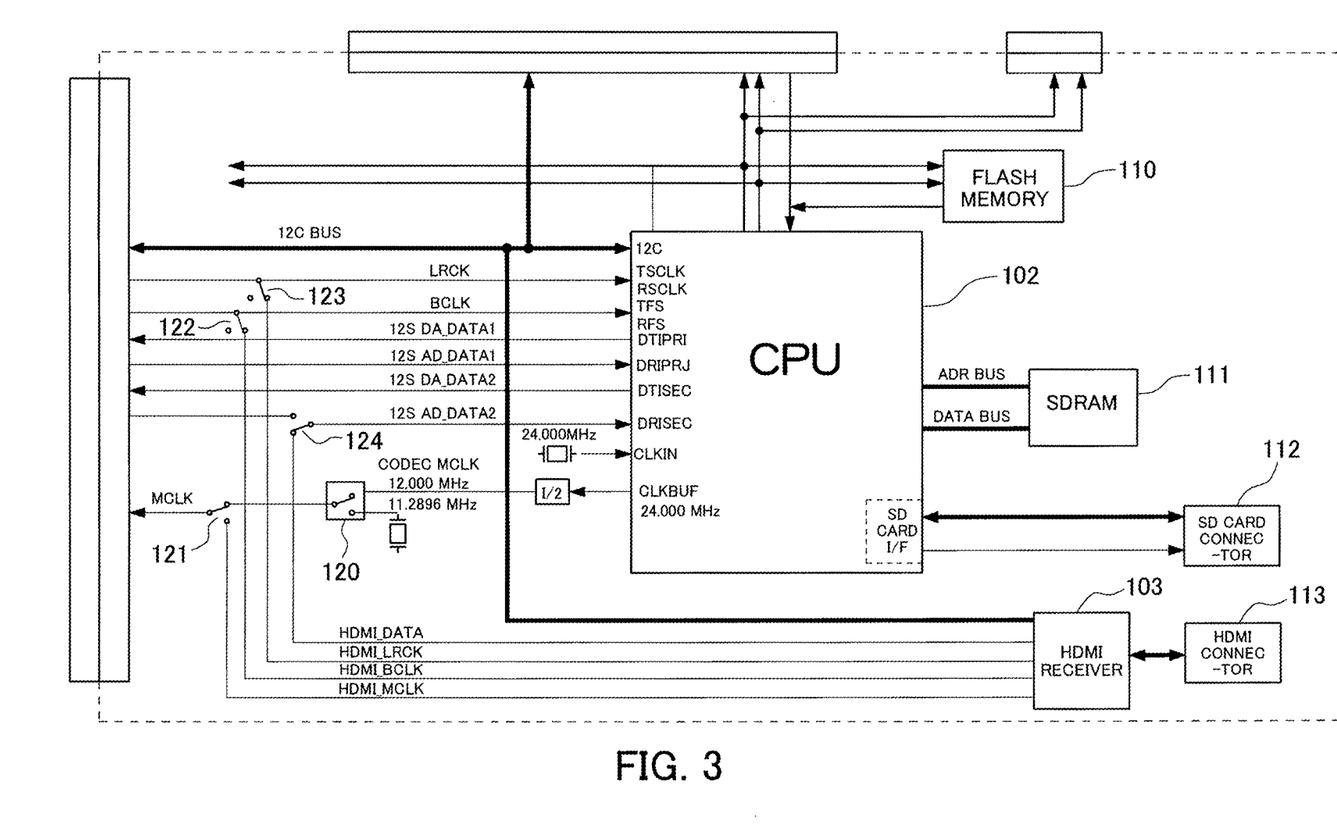
FIG. 3 is a detailed configuration block diagram of the first embodiment.

FIG. 3 is a detailed block diagram of the recorder 10 including the CPU 102 and the HDMI receiver 103.

The CPU 102 performs processing while taking the flash memory 110 and SDRAM 111 as program memory and working memory. In addition, the CPU 102 is linked to the SD card memory 112, storing the audio data into the SD card memory attached to the SD card connector 112.

AN HDMI connector 113 and an HDMI receiver 103 are provided. One end of the HDMI cable is linked to the HDMI connector 113, and the other end of the HDMI cable is linked to the camera 12.

The HDMI receiver 103 is linked to the CPU 102 via the I2C bus. The HDMI receiver 103 receives the TMDS signal from the camera 12 and generates and outputs the DATA signal, the LRCK signal, the BCLK signal, and the MCLK signal. Where a source device and a sync device are linked by means of an HDMI, there is a known technique by means of which the sync device generates an audio clock signal of the source device. Specifically, the only requirement is to transmit an N value and a CTS value, which are determined from the audio clock frequency and the TMDS clock frequency, from the source device to the sync device during a blanking period; and reproduce in the sync device an original audio clock signal (the MCLK signal) from the N value and the CTS value by taking the TMDS clock as a reference.

The MCLK signal is supplied to a switch SW 121. The switch SW 121 is equivalent of the switch SW in FIG. 2. One end of a contact of the switch is linked to the audio CODEC 104, and the other end of the contact is selectively linked to either the CPU 102 or the HDMI receiver 103. A contact of the switch SW 121 facing the CPU 102 is linked to the clock terminal CLKBUF of the CPU 102 by way of the switch SW 120. A clock signal 24.000 MHz is supplied to the clock-in terminal CLKIN of the CPU 102. The switch SW 120 selectively supplies either a 12.000 MHz signal obtained by dividing the clock signal to one-half by means of frequency division or a 11.2896 MHz signal to a switch SW 121 as a master clock signal for the CPU 102. Accordingly, when the contact of the switch SW 121 is switched to the CPU 102, either the 12.000 MHz signal or the 11.2896 MHz signal from the CPU 102 is supplied as a master clock signal to the audio CODEC 104. When the contact of the switch SW 121 is switched to the HDMI receiver 103, the MCLK signal from the HDMI receiver 103 is supplied as a master clock signal to the audio CODEC 104. The contact of the switch SW 121 is controlled by the CPU 102.

The BCLK signal, the LRCK signal, and the DATA signal are supplied to the CPU 102 by way of switches SW 122, 123, and 124. The audio data read from the semiconductor memory are output as DA DATA1 and DA DATA2 from the CPU 102 to the audio CODEC 104 via the I2S bus. The I2S is a standard for serially transferring the digital audio data between ICs. When the recorder 10 performs recording, the video data and the audio data transferred from the camera 12 do not need to be stored in memory. However, the data can also be stored in the memory as necessary.

When the HDMI SYNC is already set by the setting section 101, the CPU 102 determines whether or not a frequency of the MCLK signal generated by the HDMI receiver matches a predetermined frequency; namely, a clock frequency used in encoding operation of the audio CODEC 104. When a match exists, the contact of the switch SW 121 is switched to the HDMI receiver 103, thereby synchronizing the clock of the audio CODEC 104 with the clock of the camera 12. In the meantime, when the setting section 101 has not yet set HDMI SYNC or when the frequency of the MCLK signal does not match the predetermined frequency even when HDMI SYNC is already set, the contact of the switch SW 121 is switched to the CPU 102, thereby switching the clock of the CODEC 104 to the internal clock of the recorder 10. The reason why the switch SW 120 switches the internal clock signal is for coping with the 44.1 kHz sampling frequency of the CD system and the 48 kHz sampling frequency of the DVD system. 11.2986 MHz corresponds to 44.1 kHz, and 12.000 MHz corresponds to 48 kHz.

Figure 4:
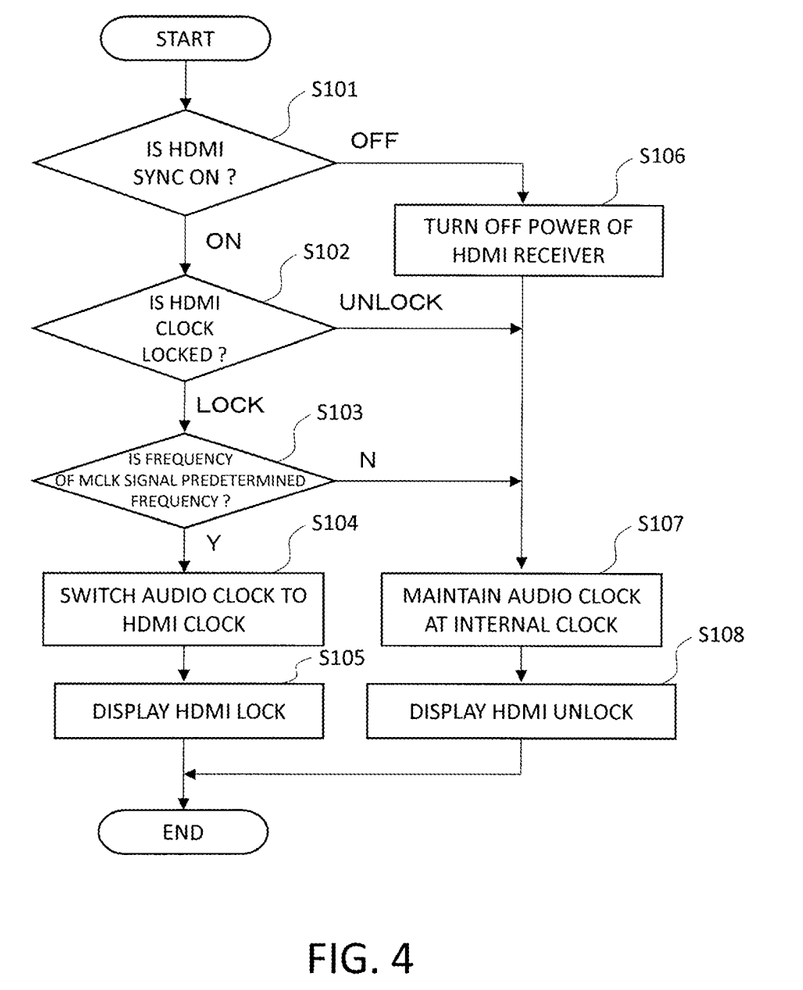
FIG. 4 is a processing flowchart of the first embodiment.

FIG. 4 is a processing flowchart of the recorder 10 of the present embodiment. It is presumed that the contact of the switch SW 121 is switched to the CPU 102 in an initial state and that the internal clock signal is supplied to the audio CODEC 104.

The CPU 102 of the recorder 10 determines whether settings of the setting section 101 are set to HDMI SYNC ON (S101).

When the setting section 101 is set to HDMI SYNC ON, it is determined whether or not the MCLK signal from the HDMI receiver 103 is LOCKed (S102). When the MCLK signal is LOCKed (the MCLK signal is reproduced and continuously output), it is also determined whether or not the frequency of the MCLK signal is a predetermined frequency (S103). The predetermined frequency is, for instance, 44.1 kHz or 48 kHz, or one obtained by multiplying the sampling frequency of any of the systems by a constant.

When the frequency of the MCLK signal is a predetermined frequency, the CPU 102 performs switching to the HDMI clock signal; namely, the MCLK signal from the HDMI receiver 103, as the master clock signal of the audio CODEC 104 (S104). "HDMI LOCK" then appears on the display section 105 (S105). By viewing the display, the user can ascertain that the clock signal of the recorder 10 is synchronized with the clock signal of the camera 12.

On the other hand, where the MCLK signal is not LOCKed in S102 and where the frequency of the MCLK signal is other than the predetermined frequency even when being LOCKed, the CPU 102 holds the internal clock signal as the master clock signal to be supplied to the audio CODEC 104 (S107). "HDMI UNLOCK" appears on the display section 105 (S108). By viewing the display, the user can ascertain that synchronization between the recorder 10 and the camera 12 is not yet established and that there can arise a loss of synchronization due to the time error between clock signals. As a matter of course, when the user simply records sounds or when the user records sounds separately from videos, the time lag does not raise any problem.

Incidentally, the HDMI receiver 103 includes a type capable of designating a frequency f the output audio clock signal and another type incapable of designating the frequency. The HDMI receiver of the type capable of designating the frequency of the output audio clock signal can fulfill conditions pertaining to S103 at all times, so long as the frequency is previously set to the predetermined frequency. However, it is uncertain for the HDMI receive of the type incapable of designating the frequency of the output audio clock signal to fulfill the predetermined frequency. Therefore, it is of significance to determine, in step S103, whether or not the frequency of the audio clock signal from the HDMI receiver 103 fulfills the conditions for the predetermined frequency of the audio CODEC 104. Even when the camera 12 can only output a fixed frequency, it is possible to adaptively determine whether to use the internal clock signal or the clock signal of the camera 12, by means of determination processing pertaining to S103.

Even when HDMI SYNC ON is set by operating the setting section 101, the master clock signal of the CODEC 104 is held, as it is, as the internal clock signal when the HDMI clock is UNLOCKed or when the HDMI clock is not the predetermined frequency. Since "HDMI UNLOCK" appears on the display section 105, the user can correctly ascertain that the recorder 10 is properly operating on the basis of the internal clock signal even when the setting section 101 is held in the HDMI SYNC ON position.

When the setting section 101 is set to HDMI SYNC OFF (OFF is selected in S101), the CPU 102 turns off the power of the HDMI receiver 103, thereby curtailing power consumption (S106). Even when the power of the HDMI receiver 103 is turned OFF, the audio CODEC 104 does not process the audio data received by the HDMI receiver 103 but processes the audio signal input by means of an unillustrated microphone, which raises no problem. Specifically, in the present embodiment, the HDMI receiver 103 can be said to be used as a functional section that receives and reproduces the audio clock signal of the camera 12. Even in this case, the master clock signal of the audio CODEC 104 is used as an internal clock signal (S107), and "HDMI UNLOCK" appears on the display section 105 (S108).

Second Embodiment

In the first embodiment, the setting section 101 sets synchronization to an ON/OFF position. However, it is also possible to omit the setting section 101 and synchronize the recorder 10 and the camera 12 at all times when they are linked to each other by means of a wired or wireless HDMI. In the first embodiment, although the MCLK signal from the HDMI receiver 103 is used also as the master clock signal, the MCLK signal and the LRCK signal also act as a clock signal. Consequently, the LRCK signal from the HDMI receiver 103 can also be used as a master clock signal. As previously mentioned, the LRCK signal is a signal showing that the data achieved in the period are Left (CH-1) or Right (CH-2). The LRCK signal shows Left at a low level and Right at a high level.

Figure 5:
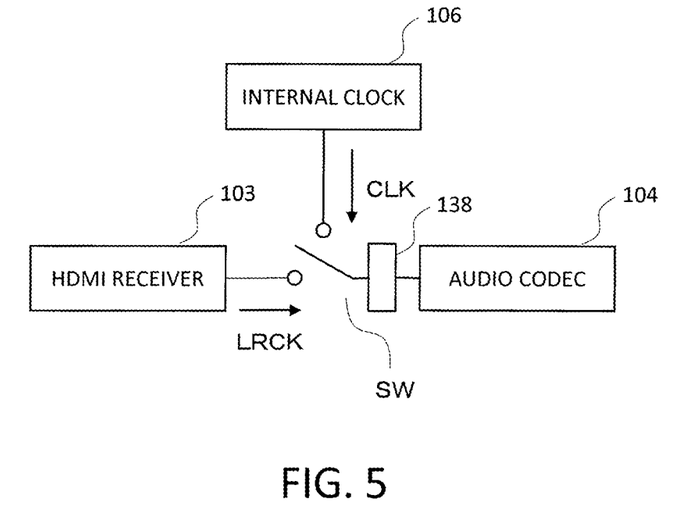
FIG. 5 is an explanatory view of switching of a master clock signal of a second embodiment.

FIG. 5 is an explanatory view diagrammatically showing switching of the master clock signal in the recorder 10 of the present embodiment.

The HDMI receiver 103 outputs the LRCK signal, which is an audio clock signal of the camera 12, to the switch SW. The internal clock 106 outputs the internal clock signal CLK to the switch SW. The CPU 102 receives the HDMI information from the HDMI receiver 103 and determines whether or not the LRCK signal from the HDMI receiver 103 fulfills the predetermined conditions. When the predetermined conditions are not fulfilled, the switch SW is switched to the internal clock 106 (or the CPU 102), and the clock signal generated from internal clock signal CLK is supplied as the master clock signal to the audio CODEC 104 by way of an audio PLL circuit 138. In the meantime, when the predetermined conditions are fulfilled, the switch SW is switched to the HDMI receiver 103, and the clock signal generated from the LRCK signal from the HDMI receiver 103 is supplied as the master clock signal to the audio CODEC 104 by way of the audio PLL circuit 138. The audio CODEC 104 subjects the input audio signal to digital conversion and encoding by use of the supplied master clock signal and storing the thus-processed audio signal into memory, thereby performing recording. The predetermined conditions are that:

the LRCK signal from the HDMI receiver 103 is LOCKed;

a frequency of the LRCK signal is a predetermined frequency.

The predetermined frequency is one at which the audio CODEC 104 performs digital conversion and coding. For instance, the predetermined frequency is any of 44.1 kHz, 48 kHz, and 96 kHz that are sampling frequencies of the CD system and the DVD system. As a matter of course, the predetermined frequency is not limited to the frequencies. The predetermined frequency can also be 32 kHz or a frequency determined by multiplying 44.1 kHz or 48 kHz by a constant according to the specifications of the device. In the first embodiment, it is included in the predetermined conditions that the user operates the setting section 101 to set HDMI SYNC ON. However, such a condition is not included in the present embodiment. Specifically, the LRCK signal from the HDMI receiver 103 is LOCKed, and, when the frequency of the LRCK signal is a predetermined frequency, the LRCK signal is supplied to the audio CODEC 104 as the master clock signal at all times.

When the HDMI link between the recorder 10 and the camera 12 is interrupted, the master clock signal is switched from the LRCK signal to the internal clock. However, if a phase shift exists between the signals, a failure might arise in processing performed by the audio CODEC 104. For this reason, it is preferable to place a phase-locked loop circuit (PLL) on a stage subsequent to the switch SW and synchronize the phase of the LRCK signal to the phase of the internal clock. This also applies to the first embodiment as well as to the second embodiment.

Figure 6:
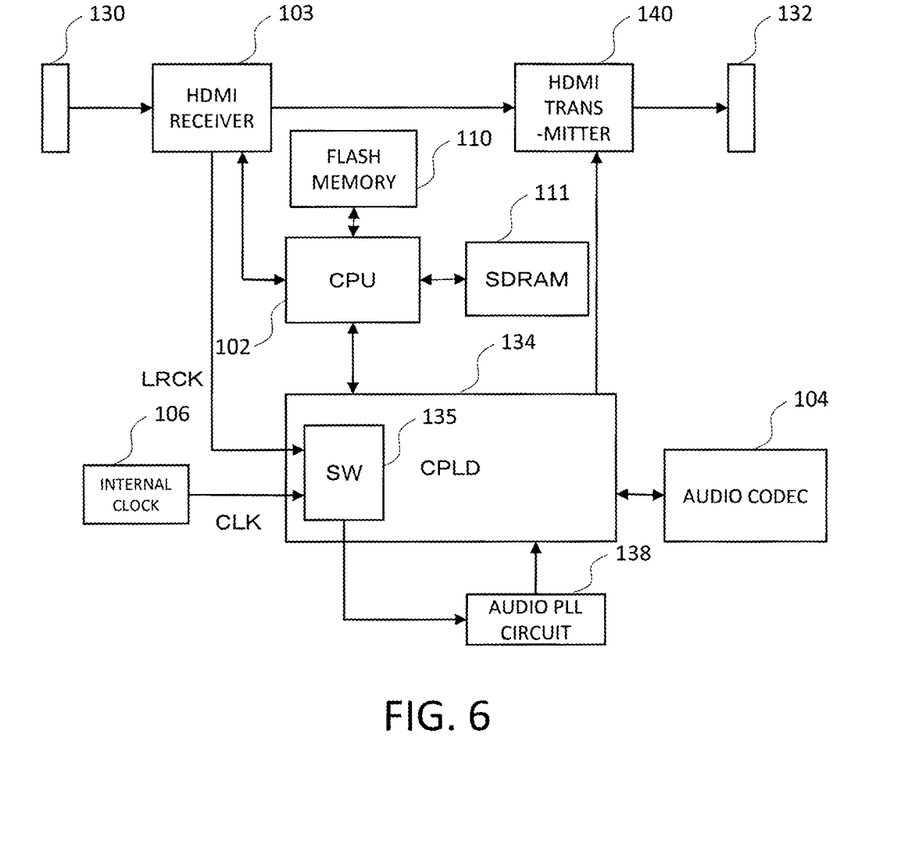
FIG. 6 is a detailed block diagram of a configuration of the second embodiment.

FIG. 6 is a detailed block diagram of the recorder 10 including the CPU 102, the internal clock 106, and the HDMI receiver 103.

The recorder 10 is equipped with an HDMI input terminal (HDMI IN) 130, an HDMI output terminal (HDMI OUT) 132, an HDMI transmitter 140, the CPU 102, the internal clock 106, a CPLD (complex programmable logic device) 134, the audio CODEC 104, and an audio phase-locked loop (PLL) circuit 138.

The HDMI input terminal 130 is linked to the camera 12 by way of the HDMI cable.

The HDMI receiver 103 outputs the LRCK signal, the BCLK (or SCLK) signal, the data signal, and the MCLK signal from the TMDS signal and the TMDS clock signal transmitted from the camera 12 byway of the HDMI cable. Under the control of the CPU 102 linked via the I2C bus, the HDMI receiver 103 supplies the LRCK signal to the CPLD 134.

In the meantime, the internal clock signal from the internal clock 106 is also supplied to the CPLD 134. For instance, the internal clock 106 outputs a 19.2 MHz signal, and the CPLD divides the 19.2 MHz signal by frequency division, thereby generating a PLL reference clock signal (for example, 153.6 kHz) based on the internal clock signal CLK.

The CPLD 134 has a switch SW 135 and switches between the LRCK signal from the HDMI receiver 103 and the PLL reference clock signal generated from the internal clock signal CLK from the internal clock 106. When there is the LRCK signal from the HDMI receiver, the switch SW135 automatically performs switching to the contact of the HDMI receiver. When there is not the LRCK signal from the HDMI receiver, the switch SW135 automatically performs switching to the contact of the internal clock. The LRCK signal from the HDMI receiver or the PLL reference clock signal is supplied to the audio PLL circuit 138. The CPLD 134 has a clock counter for detecting a frequency of the LRCK signal. Even when the frequency of the LRCK signal detected by the clock counter is not a predetermined frequency, the switch SW 135 performs switching to the contact of the internal clock as in the case where there is no LRCK signal.

The audio PLL circuit 138 generates an audio master clock signal by synchronizing the phase of the LRCK signal from the HDMI receiver or the phase of the PLL reference clock signal. The PLL circuit is known and made up of a phase comparator, a loop filter, a VCO (voltage-controlled variable oscillator) or a VCXO (voltage-controlled crystal oscillator), and a frequency divider, and synchronize the phase of an input signal with the phase of an output signal.

The audio PLL circuit 138 supplies an audio master clock signal to the CPLD 134.

The CPLD 134 supplies the audio master clock signal to the audio CODEC 104 and the HDMI transmitter 140. The LRCK signal generated from the audio master clock signal and the SCLK signal are supplied to the HDMI transmitter 140 and the audio CODEC 104.

The HDMI transmitter 140 supplies the HDMI output terminal 132 with the data signal from the HDMI receiver 103, a video pixel clock signal and an audio sync signal, the LRCK signal from the CPLD 134, the SCLK signal, and the TMDS signal generated from the MCLK signal.

When the LRCK signal is supplied from the HDMI receiver 103, the LRCK signal from the HDMI receiver 103 rather than the PLL reference clock signal from the internal clock 106 is selected. The phase of the LRCK signal is synchronized by the audio PLL circuit 138 and supplied as the audio master clock signal to the audio CODEC 104 and the HDMI transmitter 140. On the other hand, when the LRCK signal is not supplied from the HDMI receiver 103 (including a case where the frequency of the LRCK signal is not a predetermined frequency), the PLL reference clock signal is selected, and the phase of the LRCK signal is synchronized by the audio PLL circuit 138. The LRCK signal is supplied as an audio master clock signal to the audio CODEC 104.

The audio CODEC 104 subjects the audio signal to various processing, including AD conversion and encoding, as in the case with the first embodiment, storing and recording the audio signal in semiconductor memory, such as the SDRAM 111, by way of the CPU 102. The audio data stored in the SDRAM 111, and the like, are read by way of the CPU 102, undergo decoding and DA conversion, and are output as an analog audio signal.

As mentioned above, in the present embodiment, the PLL circuit 138 is placed on a stage subsequent to the switch SW 135, whereby the contact of the switch SW 135 is switched. Even when a signal which is to serve a basis for the audio master clock signal is switched between the LRCK signal of the HDMI receiver and the PLL reference clock signal, the audio CODEC 104 can perform processing without fail by phase synchronization.

Figure 7:
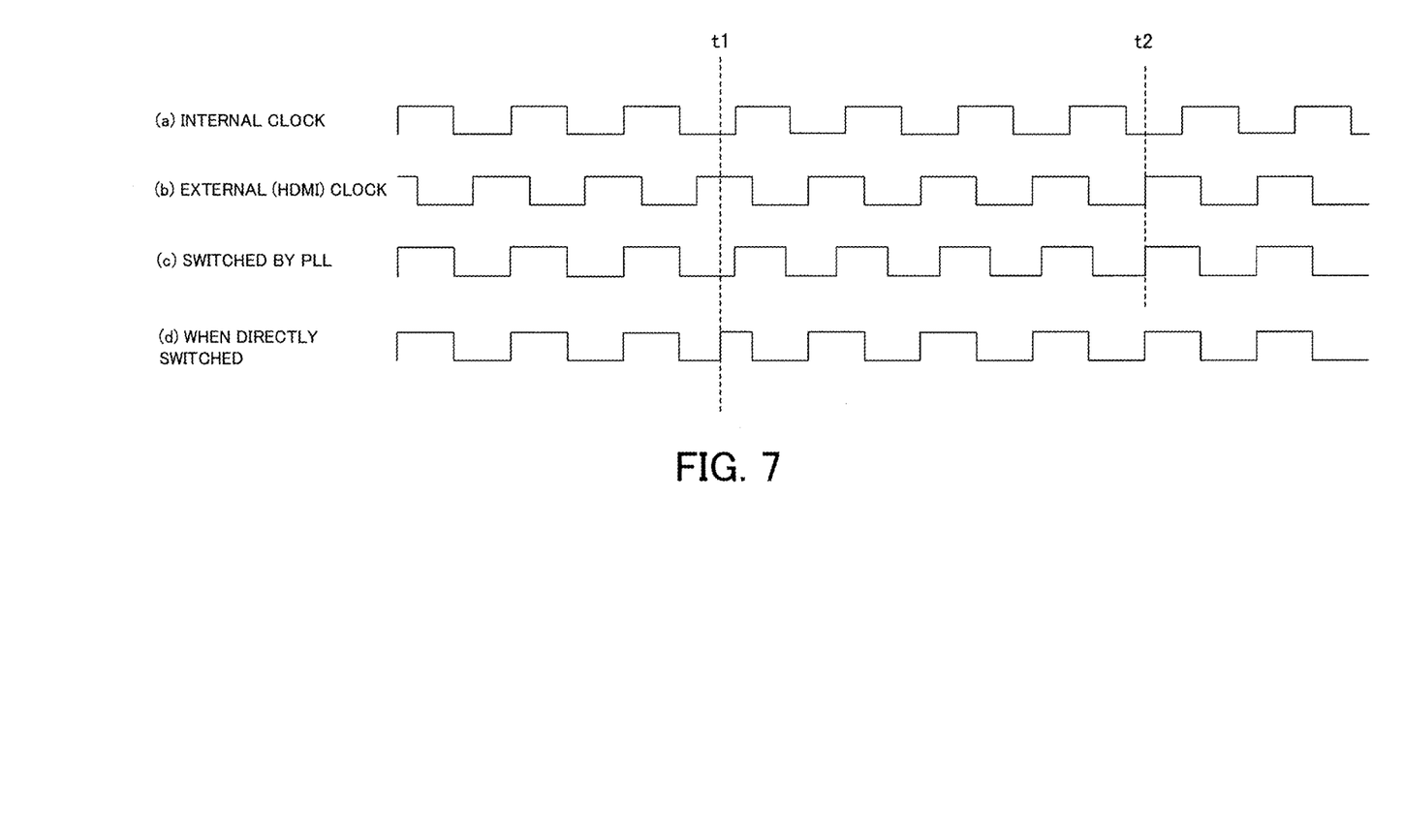
FIG. 7 is a timing chart of the second embodiment.

FIG. 7 shows a timing chart achieved before and after switching between the audio mater clock signal (internal clock) based on the internal clock signal CLK and the audio master clock signal (external clock) based on the LRCK signal of the HDMI receiver. Further, for comparison purpose, there is shown a timing chart achieved before and after switching performed when the PLL circuit does not perform phase synchronization (when the audio master clock signal is directly switched). When the internal clock signal CLK is switched to the LRCK signal at time t1 and when there is not the PLL circuit, the phase discontinuously varies at time t1. In the meantime, when the PLL circuit is used, the phase is naturally synchronized at time t2. In the present embodiment, the phase (continuity of a clock) is seen to be maintained before and after switching of the audio master clock signal.

Although the embodiments of the present invention have been described above, the present invention is not limited to the above and susceptible to various modifications.

For instance, in the processing flowchart of the first embodiment shown in FIG. 4, it is determined whether or not the HDMI cable is linked. When the HDMI cable is not linked, the master clock signal of the audio CODEC 104 can also be switched to the internal clock signal. Even in this case, it is desirable to turn off the power of the HDMI receiver 103. The same also applies to the second embodiment.

When the HDMI receiver 103 is of known type; namely, when it is already known that the output audio clock signal of the HDMI receiver 103 can be designated, determination processing pertaining to S103 can also be omitted.

Further, in the second embodiment, the CPLD 134 can also be equipped with an MCLK selector and configured so as to supply, in a switching manner, the audio master clock signal from the audio PLL circuit 138 (or the audio master clock signal generated from the LRCK signal) and the MCLK signal from the HDMI receiver 103 to the audio CODEC 104.

What is claimed is:

1. A camera link recorder comprising:
    an HDMI receiver for receiving an audio clock signal of a camera according to an HDMI signal transmitted from the HDMI-linked camera;
    a signal processing section for subjecting an input audio signal to digital conversion and encoding and storing the signal; and
    a control section for supplying the audio clock signal as a master clock signal of the signal processing section when the audio clock signal generated by the HDMI receiver is at a predetermined frequency corresponding to the signal processing section, and for supplying an internal clock signal as the master clock signal of the signal processing section when there is not the audio clock signal or when the audio clock signal is not at a predetermined frequency corresponding to the signal processing section.

2. The camera link recorder according to claim 1, further comprising:
    a phase-locked loop circuit for matching a phase of the audio clock signal to a phase of the internal clock signal.

3. The camera link recorder according to claim 2, wherein the audio clock signal is a signal generated from an LRCK signal.

4. The camera link recorder according to claim 1, wherein the audio clock signal is an MCLK signal.

5. The camera link recorder according to claim 1, further comprising:
   a setting section for setting whether or not to establish synchronization with the audio clock signal of the camera, wherein the control section supplies the audio clock signal as the master clock signal when the setting section has already set synchronization, and supplies the internal clock signal as the master clock signal when the setting section has not set synchronization, thereby controlling power of the HDMI receiver to OFF.

6. The camera link recorder according to claim 1, wherein the control section supplies the internal clock signal as the master clock signal when the HDMI cable is not linked, thereby controlling power of the HDMI receiver to an OFF position.

7. The camera link recorder according to claim 1, wherein the control section selectively supplies either a signal generated from the LRCK signal or an MCLK signal as the master clock signal of the signal processing section by switching.

* * * * *